United States Patent [19]
Schutz

[11] 4,264,367
[45] Apr. 28, 1981

[54] ADMIXTURES AND METHOD FOR ACCELERATING THE SETTING OF PORTLAND CEMENT COMPOSITIONS

[75] Inventor: Raymond J. Schutz, Augusta, N.J.

[73] Assignee: Sika Chemical Corporation, Lyndhurst, N.J.

[21] Appl. No.: 858,409

[22] Filed: Dec. 7, 1977

Related U.S. Application Data

[63] Continuation-in-part of Ser. No. 493,977, Aug. 1, 1974, abandoned, and a continuation of Ser. No. 565,711, Apr. 7, 1975, abandoned, and a continuation of Ser. No. 663,089, Mar. 2, 1976, abandoned.

[51] Int. Cl.³ .................................................. C04B 7/02
[52] U.S. Cl. ......................................... 106/90; 106/315
[58] Field of Search ............................ 106/90, 315, 97

[56] References Cited

U.S. PATENT DOCUMENTS

| | | | |
|---|---|---|---|
| 2,542,364 | 2/1951 | Schenker et al. | 106/88 |
| 3,547,853 | 12/1970 | Kalandiak | 260/29.6 |
| 3,619,221 | 11/1971 | Kossivas | 106/315 |
| 3,656,985 | 4/1972 | Bonnel et al. | 106/90 |
| 3,782,984 | 1/1974 | Allemand | 106/90 |

FOREIGN PATENT DOCUMENTS

| | | |
|---|---|---|
| 1265022 | 3/1968 | Fed. Rep. of Germany . |
| 2404269 | 8/1975 | Fed. Rep. of Germany . |
| 86773 | 8/1971 | German Democratic Rep. . |
| 174027 | 12/1934 | Switzerland . |
| 248735 | 5/1947 | Switzerland . |
| 497351 | 11/1970 | Switzerland . |
| 405508 | 2/1934 | United Kingdom . |
| 1236263 | 6/1971 | United Kingdom . |
| 1354053 | 5/1974 | United Kingdom . |

OTHER PUBLICATIONS

Feldman et al., "Influence of $CaCO_3$ on the Hydration of $3 CaO.Al_2O_3$", J. Amer. Ceramic Soc., Jan. 1965, pp. 25–30.
Chem. Abs. 77, 92328d (1972).
Chem. Abs. 69, 5001K (1968).
Chem. Abs. 83, 183081h (1975).
Brunauer et al., "The Chemistry of Concrete", *Scientific American*, vol. 210, pp. 80–92, Apr. 1964.
Lea, F. M., "The Chemistry of Cement and Concrete", Edward Arnold Ltd. 1956, pp. 252 and 253.
Feldman et al., "The Influence of $CaSO_4.2H_2O$ Upon the Hydration Character of $3CaO.Al_2O_3$", *Magazine of Concrete* Res. 18, pp. 185–196, (Dec. 1966).
Feldman et al., "Character of Hydration of $3CaO.Al_2O_3$", *Journal of the American Ceramic Society*, 49, pp. 268–272 (1966).

*Primary Examiner*—L. Dewayne Rutledge
*Assistant Examiner*—John P. Sheehan
*Attorney, Agent, or Firm*—Pennie & Edmonds

[57] ABSTRACT

A method of and compositions for accelerating the setting time of portland cement compositions are disclosed. Certain admixtures, comprising water-soluble carbonates and α-hydroxy carbonyl compounds, are employed as accelerators. Preferred accelerators further comprise water-soluble organic compounds having a plurality of hydroxyl groups. The concentration of admixture relative to cement necessary to achieve acceleration depends upon the identity of the admixture, the water-cement ratio, and the amount and type of aggregate in the composition, among other factors.

28 Claims, No Drawings

ADMIXTURES AND METHOD FOR ACCELERATING THE SETTING OF PORTLAND CEMENT COMPOSITIONS

CROSS REFERENCE TO RELATED APPLICATIONS

This application is a continuation-in-part of application Ser. No. 493,977, filed Aug. 1, 1974, now abandoned; a continuation of application Ser. No. 565,711, filed Apr. 7, 1975, abandoned; and a continuation of Ser. No. 663,089, filed Mar. 3, 1976, abandoned.

FIELD OF THE INVENTION

This invention relates to a method of accelerating the setting time of concretes, mortars, and other compositions containing portland cement (i.e. "portland cement compositions").

BACKGROUND OF THE INVENTION

Additives for modifying the setting time and other properties of portland cement compositions have been employed virtually since the beginning of cement technology in the 1870's. Cement itself, a mixture of (1) a lime-containing material such as limestone, shell or chalk, and (2) clay or a source of clay such as shale or slate, flash sets in a matter of seconds or minutes when mixed with water, leaving virtually no time for adequate mixing, pouring, or other necessary processing operations. To make it commercially useful, therefore, essentially all cement as sold contains a few percent gypsum, which delays setting for a number of hours. In order to shorten or lengthen the setting time for specific applications, accelerating or retarding admixtures are employed. Such admixtures are defined by ASTM publication C 494-71, which also defines "water reducing" admixtures as those which reduce the amount of water necessary to produce concrete of a given consistency. Both accelerating and retarding admixtures are known which also effect water reduction.

The setting times for commercially available cements vary fairly widely, but are typically on the order of three hours as determined by the final setting time of the Gillmore or Vicat Needle methods (ASTM C 266 or ASTM C 191). The setting times of mortars made with such cements measured by the initial setting time of the Proctor Needle test (ASTM C 403) is about seven hours. These setting times must be significantly reduced, for example, in the manufacture of molded concrete products such as concrete blocks, in the manufacture of pavements and bridge surfaces, and in the construction of concrete buildings. In numerous applications, the impetus for shortening the setting time is at least in part the high cost of overtime labor.

As is widely recognized in this art, the Gillmore Needle, the Vicat Needle, and Proctor Needle tests may be used to determine setting times of portland cement compositions of various proportions and are not restricted to the specific compositions and proportions of ingredients, e.g. water-cement ratios, recited in ASTM C 266, ASTM C 191, and ASTM C 403. As used herein the terms "Gillmore Needle test", "Vicat Needle test" and "Proctor Needle test" refer to carrying out generally the procedures specified in the ASTM references on the particular sample of portland cement composition of interest.

One application which inherently demands very short setting times is shotcreting, a process of spraying mortar on a supporting surface to obtain both structural strength and desired surface properties. Shotcreting is employed for example in the construction of tunnels drilled through rock, and the concrete must achieve a high percentage of its ultimate strength, after it is sprayed on, in a shorter period than the relaxation time of the rock in order to prevent the tunnel from collapsing.

There are both so-called wet and dry shotcrete processes. In the wet process, the cement mixture including water is fully prepared and then sprayed on the tunnel wall or other surface from a nozzle. In the dry process, all the dry ingredients are mixed and fed to the nozzle, and the water is added in the nozzle. Note that greater acceleration of setting time can be achieved generally with the dry process because there is no risk of the mixture setting up in the equipment prior to being sprayed. In either process the shotcrete must harden in less than fifteen minutes, as measured by the Proctor Needle test final setting time, in order that a useful thickness of shotcrete may be applied to a surface without its sloughing off.

Accelerating admixtures for shotcreting in general commercial use today are mixtures of sodium carbonate and sodium aluminate. While they afford acceptable early strengths relative to plain mortar, they typically reduce the ultimate strength of the mortar by more than half, requiring the use of thicker layers of mortar than would be necessary in the absence of the accelerator to achieve the same structural strength. Additionally, these admixtures are highly caustic and great care must be taken in handling them. Only a limited degree of acceleration can be achieved with sodium carbonate-sodium aluminate accelerators without reducing the ultimate strength of the shotcrete to an unacceptable level. There exist applications requiring shorter setting times and rapid early strength development for which no satisfactory accelerating admixtures have been available.

A second application which requires very fast setting times is the use of portland cement plugging compounds. Plugging compounds consist of portland cement, fine aggregate such as mason's sand, and an accelerator and are used to repair broken or cracked concrete when water is leaking through the fracture. Plugging compounds must have a final setting time as measured by the Vicat Needle test of less than fifteen minutes in order to ensure that the compound will harden and stop the leak before it is washed away.

Portland cement compositions used to repair damaged concrete articles and structures must harden quickly so that the time taken to make the repair will be short. Quick-setting-mortar compounds generally consist of portland cement, fine aggregate, and an accelerator and are used for repairing chipped or cracked concrete and other small jobs. They require final setting times of thirty minutes or less as measured by the Vicat Needle method. Concrete patching compounds contain cement, coarse and fine aggregate, and an accelerator and are generally used for making larger repairs such as filling potholes in concrete pavement. Concrete patching compounds must have final setting times of one hour or less as measured by the Vicat test. Their setting times typical are somewhat longer than those of quick-setting-mortar compounds because of the longer time required to mix and apply the larger quantities of concrete patching compound. The Vicat Needle test may be carried out directly on samples of mortar. In the case of concrete, the Vicat test is carried out on the mortar of the sample, which may be separated from the coarse aggregate by sieving, as provided in ASTM C 403.

Perhaps the most widely used accelerator for most concrete applications is calcium chloride. Although it does not accelerate setting times sufficiently for use in shotcrete processes, it is used for most other applications and has the advantage of being very inexpensive. It is severely limited, however, in that chloride ion is highly corrosive in contact with ferrous metals, and also promotes an electrochemical reaction between dissimilar metals. Hence calcium chloride generally cannot be used as an accelerator for reinforced concrete or other applications involving concrete-metal interfaces.

A review of the prior art relating to accelerators in general and to hydroxy-carbonyl retarders demonstrates that it is difficult to make generalizations about the effect of broad classes of compounds on the setting times of portland cement. For example, although the essentially ionic salt calcium chloride is an efficient accelerator, sodium chloride and potassium chloride, also ionic chlorides, are substantially less efficient accelerators. Moreover, merely because a particular compound functions as an accelerator does not imply that there are concentrations at which it will shorten setting times sufficiently to be used in applications such as shotcrete and plugging compounds, which require particularily short setting times. As noted above, for example, calcium chloride is a widely used accelerator for portland cement, but it does not shorten setting times sufficiently to be used for shotcreting.

The problems of making generalizations about the effects of an admixture on the setting times of portland cement compositions are compounded if the admixture has more than one constituent each of which individually has a different effect on the setting of portland cement compositions. It is not possible in general to decide if a particular mixture of an accelerator and a retarder will accelerate or retard a portland cement composition.

The difficulties in predicting the effects of compounds and mixtures of compounds on the setting times of portland cement compositions stem from the fact that changing setting times is a catalytic effect. In many fields of chemistry it is recognized that the mechanisms of catalysis are relatively poorly understood. The field of cement chemistry is no exception. Since even the basic reactions involved in the hardening of portland cement are not fully understood at this time, the effect of a given admixture in catalylzing the reactions, i.e. in accelerating or retarding setting times, is for the most part impossible to predict successfully. In general, resort must be had to empirical measurements.

It has been known since the late 1930's that certain organic hydroxy carbonyl compounds could influence the setting times of portland cement. The prior art teaches that certain hydroxy carbonyl compounds, including some of the α-hydroxy carbonyl compounds included in the accelerators of the present invention, *retard* the setting of portland cement rather than accelerate it. This prior art, the most pertinent of which is discussed below, does not disclose or suggest the accelerators of the present invention and in fact, strongly suggests that such compounds would not function as accelerators.

One reference teaches broadly that the α-hydroxy carbonyl group,

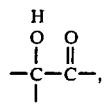

is very active in retarding the hydration of portland cement, the degree of hydration being a measure of its degree of hardening. In this reference, "Proceedings of the International Symposium on the Chemistry of Cement," Washington, D.C. 1960, pages 924–925, J. H. Taplin classifies hydroxyacetic acid as a strong retarder on the basis of data obtained from cement paste specimens having water-cement ratios of 0.30 and containing one percent admixture by weight. Lactic acid, classified as having a negligible retarding effect, is called exceptional in that it contains the α-hydroxy carbonyl group but does not retard. Taplin nonetheless concludes that "it appears to be a general rule, that for an organic substance to *retard* cement, it must have at least two oxygen atoms each bound to a single but different carbon atom in such a way that the oxygen atoms can approach each other." The Taplin reference contains no teaching or suggestion that hydroxyacetic or lactic acid might be useful individually as accelerators for portland cement compositions, or in combination with one or more other ingredients to form an accelerating admixture.

A second reference which similarly teaches away from the present invention is U.S. Pat. No. 3,144,347, issued Aug. 11, 1964 to E. I. du Pont de Nemours & Company. The '347 patent teaches the use of hydroxyacetic acid, lactic acid, and their sodium, calcium, potassium and amine salts as retarding admixtures in concentrations ranging from about 0.001 to 3.5 weight percent relative to the cement. The patent recites further (Column 1, lines 33–35) that "most often less than about 0.8 weight percent will be used, and particularly advantageous results are obtained within the narrow range of 0.01 to 0.1 weight percent". All of the specific examples contained in columns 3 and 4 of the patent relate to the use of less than 0.8 weight percent of the foregoing retardant admixtures in concretes. The second paragraph of the patent defines the scope of the asserted invention as relating to "a small class of monohydroxy organic compounds . . . which not only serve as excellent water reducing *retardants* but at the same time causes a significant increase in the compressive strength of the concrete." The sole and plain teaching of the '347 patent is thus that the recited compounds are useful as retarding agents and, concomitantly, as ultimate strength increasing agents.

The only suggestion whatsoever in the prior art that a specific α-hydroxy carbonyl compound may have some utility as an accelerator is found in Japanese Patent Application Publication No. 13680 of 1972, dated 24 Apr. 1972 and assigned to Hani Chemical Company, Ltd., by Kenji Harazawa. Precisely what the Harazawa patent does or does not teach one of ordinary skill in this art is at best unclear. It states that calcium monoglycolate and calcium diglycolate effect a limited reduction in the initial setting time of portland cement, and further that "it is particularly preferred to use portland cement and mixed gypsum plaster." It is unclear what "gypsum plaster" is, or why one would want to mix it with cement. Although the terminology is ambiguous, calcium diglycolate is generally used to refer to the calcium salt of diglycolic acid, which is not an α-hydroxy carbonyl compound. Even giving Haraza the benefit of all doubts, his preferred range is between 0.05 and 0.15 percent admixture with respect to the cement, and the shortest final setting time disclosed for either compound is one hour and forty-five minutes. The shortest final setting time for calcium monoglycolate is one hour and fifty minutes, as measured by JIS R-5201, a Vicat Needle test. For reasons stated above, it is not possible to extrapolate with respect to the effect of higher concentrations of admixture, and Harazawa contains no suggestion whatsoever that the salts recited by him, or any other compounds, might make useful accelerators for applications requiring fast setting times such as shotcreting, plugging compounds, and quick-setting mortars. Furthermore, there is no suggestion that the salts recited might usefully be combined with one or more additional compounds to form an accelerator with the properties disclosed below. The patent contains no suggestion of the invention disclosed and claimed herein.

As noted above in connection with shotcreting, sodium carbonate has been used as a component in accelerators. A book by Lea and Desch entitled *The Chemistry of Cement and Concrete*, (Edward Arnold Publishers, 1956) points out on page 252 that alkali carbonates produce a very strong acceleration of the set, the addition of 1-2 percent reducing the time of initial set to a few minutes.

SUMMARY OF THE INVENTION

The present invention relates to an admixture for accelerating the setting time of portland cement compositions. The admixture comprises a water-soluble carbonate compound and an α-hydroxy carbonyl compound selected from the group consisting of hydroxyacetic acid, lactic acid, 2-methyllactic acid dl-mandelic acid and their water-soluble salts. For example, an admixture of the present invention might include sodium carbonate and sodium hydroxyacetate.

The parent applications to the present application disclose that certain α-hydroxy carbonyl compounds, long thought to retard the setting of portland cement compositions, could in fact function as accelerators. Certain of the accelerators disclosed in those earlier applications are able to speed the setting of portland cement sufficiently to be useful as accelerators in shotcreting applications. In such cases, as noted above, the final setting time must be less than fifteen minutes as measured by the Proctor Needle test. Many of the α-hydroxy carbonyl accelerators of those earlier applications are capable of reducing portland cement setting time to less than five minutes.

For many applications other than shotcreting, such extremely short setting times are a disadvantage because they do not permit enough time for mixing and spreading the cement. For example, it can take thirty minutes or so to mix, apply, and smooth a concrete patch to repair a pothole in a road. Accelerated concrete with a much shorter setting time would therefore be unsuitable for that application.

While it is generally possible to obtain setting times longer than the extremely short setting times required for shotcreting by carefully selecting the concentration of an α-hydroxy carbonyl accelerator, such a procedure is not always practical since the setting time may be unduly dependent upon accelerator concentration. For example, for setting times of a mortar above a few minutes the setting time may be so highly dependent upon sodium hydroxyacetate concentration as to preclude obtaining adequately uniform setting times in production quantities. Such setting times are additionally very dependent upon water-cement ratio and similar parameters, further aggravating production control problems.

In the present invention, it has been found that the combination of an α-hydroxy carbonyl accelerator with a water-soluble carbonate salt affords setting times generally significantly longer than those obtained with α-hydroxy carbonyl accelerator alone yet substantially shorter than unaccelerated portland cement and with a more rapid early strength development than that of the unaccelerated cement.

Combining an α-hydroxy carbonyl accelerator with a soluble carbonate also tends somewhat to reduce the dependency of setting time on admixture concentration, particularly for setting times only a few minutes longer than the setting times resulting from the α-hydroxy carbonyl accelerator alone. For still longer setting times, however, the setting times have been found to be erratic and once again concentration dependent, leading to difficulties in producing mortars of predictable setting times. The concentration dependence especially makes it difficult to mix large production batches of mortar sufficiently uniformly for different samples taken from a batch to have the same setting time.

Surprisingly, it has been found possible to achieve both longer setting times and a greatly reduced concentration dependence by including a water-soluble organic compound having a plurality of hydroxy groups with the soluble carbonate and α-hydroxy carbonyl accelerator. Such compounds, for example sodium gluconate are known retarders for portland cement compositions. Very low concentrations of such compounds have been found to have a surprisingly large synergistic effect in lengthening the setting time and reducing the unpredictability and concentration dependence of setting times of portland cement mortars accelerated with a soluble carbonate and an α-hydroxy carbonyl compound. Beneficial effects similar to those discussed above for water-soluble organic compounds having a plurality of hydroxy groups can also be obtained by using the monohydroxy compound citric acid or its sodium, potassium, or calcium salts.

DETAILED DESCRIPTION OF PREFERRED EMBODIMENTS

The setting time which results from a particular admixture in accordance with the present invention will vary for specific applications depending upon the composition and concentration of the mixture, the water-cement ratio, the nature and quantity of aggregates used, the composition of the cement, the order in which the ingredients are mixed, and the temperature and other conditions under which the constituents are mixed and set. A preferred accelerator in accordance with the present invention includes a mixture of sodium hydroxyacetate, sodium carbonate, and sodium gluconate. When this mixture is mixed with a portland cement mortar, the ratio of the weight of sodium hydroxyacetate to that of the cement is preferably in the range of from $6 \times 10^{-4}$ to about $5 \times 10^{-2}$; the ratio of the weight of sodium carbonate to that of the cement is preferably in the range of from about $6 \times 10^{-4}$ to about $2 \times 10^{-2}$; and the ratio of the weight of sodium gluconate to that of the cement is preferably in the range of about $8 \times 10^{-5}$ to about $3 \times 10^{-2}$.

Preferred α-hydroxy carbonyl compounds for the present invention are hydroxyacetic acid, lactic acid, 2-methyllactic acid, dl-mandelic acid and their sodium, potassium, calcium, lithium, zinc, and triethanolamine salts. Preferred water-soluble carbonates are sodium and potassium carbonates.

Preferred water-soluble organic compounds having a plurality of hydroxy groups are gluconic acid, lignosulfonic acid, heptogluconic acid, and their sodium, potassium, and calcium salts. Polysaccharides are also suitable organic compounds having a plurality of hydroxy groups.

In general, the admixture constituents are preferably selected such that the admixture is approximately neutral in pH, allowing it to be handled without the special precautions required in connection with the highly caustic prior-art admixtures.

The accelerating admixtures of the present invention cause neither reaction with ferrous metals nor electrolytic action between different metals, and are thus suitable for use in connection with reinforced and prestressed concretes as well as in other applications involving a cement, mortar, or concrete-metal interface.

One of the most surprising aspects of the present invention is that the combination of water-soluble carbonate, which is an accelerator, with an α-hydroxy carbonyl compound, which is also an accelerator, leads to longer setting times than are obtained with the α-hydroxy carbonyl compound alone. One possible explanation for this phenomenon may lie in the observation that portland cement is generally composed of three principal components, $C_3A$ (tricalcium aluminate), $C_3S$ (tricalcium silicate), and $C_2S$ (dicalcium silicate), which harden at different rates and are affected differently by different admixtures. The hardening of $C_3A$ determines the setting time of a cement mix since this component hardens most rapidly. The early strength development, on the other hand, is principally due to the hardening of $C_3S$. Since α-hydroxy carbonyl accelerators both shorten setting time and speed early strength development, they apparently accelerate both $C_3A$ and $C_3S$. Sodium carbonate and other soluble carbonates, on the other hand, appear to accelerate the setting of $C_3S$ while retarding the setting of $C_3A$. The acceleration of $C_3S$ by soluble carbonates nevertheless is sufficient to cause an overall shortening of the setting time relative to unaccelerated cement. The apparent result of mixing an α-hydroxy carbonyl accelerator with a soluble carbonate is therefore to moderate the affect of the α-hydroxy carbonyl accelerator on $C_3A$, but not on $C_3S$. The setting time is thus lengthened, but the early strength development remains substantially unaffected relative to the use of the α-hydroxy carbonyl accelerator alone.

Sodium gluconate and other compounds having a plurality of hydroxy groups appear to moderate the affect of the two accelerators on both $C_3A$ and $C_3S$, delaying both setting time and early strength development somewhat. This is consistent with the observation that water-soluble organic compounds having a plurality of hydroxy groups appear to retard the setting of portland cement by coating the particles of cement with a film, thereby reducing contact between the cement particles and water. Even taking into account the moderation of the early strength development caused by the inclusion of sodium gluconate, preferred composite admixtures of the present invention result in mortars exhibiting early strengths substantially greater than the early strengths of mortars employing prior-art accelerators. The foregoing explanation is offered for the sake of completeness and is not to be construed as limiting the invention in any way.

EXAMPLES

The following specific examples of portland cement compositions and their effects on setting time will facilitate a better understanding of the invention.

EXAMPLE I

The following dry mortars were prepared:

|  | A | B | C |
|---|---|---|---|
|  |  | (parts by weight) |  |
| Atlas Type I cement | 78.0 | 77.8 | 77.5 |
| Federal Fine Sand | 20.0 | 19.9 | 19.8 |
| Sodium Glycolate | 2.0 | 1.9 | 1.9 |
| Sodium Carbonate | 0.0 | 0.4 | 0.8 |

The final setting time of these mortars as measured by the Vicat Needle test (using a water-cement ratio of 0.30) and the compressive strengths after one or five hours were as follows:

|  | Setting Time | Compressive Strength |
|---|---|---|
| Mortar A | 1' 15" | 1710 psi (5 hours) |
| Mortar B | 3' 30" | 990 psi (1 hour) |
| Mortar C | 17' 30" | 1080 psi (1 hour) |

It is apparent that the addition of sodium carbonate lengthens the setting time of the mortar.

EXAMPLE II

The following mortars were prepared:

|  | D | E |
|---|---|---|
|  | (parts by weight) |  |
| Atlas Type I cement | 77.7 | 75.5 |
| Federal Fine Sand | 19.4 | 18.9 |
| Sodium Lactate | 2.9 | 2.8 |
| Sodium Carbonate | 0.0 | 2.8 |

The following final setting times were measured using the Vicat Needle test:

|  | Setting Time | Water-Cement Ratio |
|---|---|---|
| Mortar D | 1' | 0.28 |
| Mortar E | 17' | 0.29 |

Thus adding sodium carbonate to a mortar accelerated with sodium lactate is seen to increase the setting time significantly.

EXAMPLE III

The following dry mortar was prepared:

| Atlas Type I cement | 600 g |
|---|---|
| Federal Fine sand | 400 g |
| Sodium Hydroxyacetate | 5 g |

From this mortar the following six samples were prepared for which the corresponding initial setting times were measured by the Gillmore Needle test:

| Sample | Sodium Carbonate (weight percent) | Sodium Gluconate (weight percent) | Setting Time |
|---|---|---|---|
| F | 0.2 | 0.0 | 3' 5" |
| G | 0.5 | 0.0 | 4'10" |
| H | 0.8 | 0.0 | 5'40" |
| I | 0.2 | 0.02 | 17'15" |
| J | 0.5 | 0.02 | 16'50" |
| K | 0.8 | 0.02 | 3'30" |

The weight percentages are relative to the total weight of the mortar sample. The water-cement ratio was 0.35.

Note that as the concentration of sodium carbonate increases from 0.2 to 0.5 weight percent, the setting time remains essentially constant for samples I and J, which include 0.02 weight percent sodium gluconate. Over this concentration range, therefore, the setting time of the mortar is quite insensitive to the concentration of sodium carbonate.

Over the same concentration range the addition of sodium gluconate also has the effect of lengthening the initial setting time from about three or four minutes to about seventeen minutes. As the concentration of sodium carbonate is increased to 0.8 weight percent, the initial setting time drops to less than four minutes for the samples containing sodium gluconate. At this concentration, the usual accelerating effect of sodium carbonate apparently predominates over its retarding effect in combination with sodium hydroxyacetate.

EXAMPLE IV

The following fast-setting, premixed mortar was prepared:

| | parts by weight |
|---|---|
| Hercules Type I cement | 79.270 |
| Mason's Sand (ASTM C-144) | 19.818 |
| Sodium Hydroxyacetate | 0.664 |
| Sodium Carbonate | 0.198 |
| Sodium Gluconate | 0.005 |
| Stone dust | 0.045 |

The initial setting time of this mortar was between five and ten minutes as measured by the Gillmore Needle test with a water-cement ratio of 0.3. This mortar is suitable as a quick-setting mortar compound.

I claim:

1. A method for accelerating the setting time of a quantity of portland cement composition comprising mixing with the composition:
  (a) a first ponderable amount of a water-soluble carbonate compound selected from the group consisting of sodium carbonate and potassium carbonate; and
  (b) a second ponderable amount of an α-hydroxy carbonyl compound selected from the group consisting of hydroxyacetic acid, lactic acid, 2-methyllactic acid, dl-mandelic acid and their water-soluble salts, the second amount being effective to accelerate the portland cement composition in the absence of any other admixture;
the first and second amounts being efffective in combination to accelerate the portland cement composition, and essentially the only constituents of the accelerated portland cement composition influencing its setting time being the water-soluble carbonate compound, the α-hydroxy carbonyl compound, portland cement, and water.

2. The method of claim 1 in which the carbonate compound is sodium carbonate and the α-hydroxy carbonyl compound is sodium hydroxyacetate.

3. The method according to claim 1 in which the first amount of water-soluble carbonate compound and the second amount of α-hydroxy carbonyl compound are such that the final setting time of the portland cement composition containing the two amounts is greater than the final setting time of a corresponding control portland cement composition in which the water-soluble carbonate compound is omitted, the final setting times being measured by the Vicat Needle test.

4. A method for accelerating the setting time of a quantity of portland cement composition comprising mixing with the composition:
  (a) a first ponderable amount of a water-soluble carbonate compound selected from the group consisting of sodium carbonate and potassium carbonate;
  (b) a second ponderable amount of an α-hydroxy carbonyl compound selected from the group consisting of hydroxyacetic acid, lactic acid, 2-methyllactic acid, dl-mandelic acid and their water-soluble salts; and
  (c) a third ponderable amount of a water-soluble organic retardant selected from the group consisting of retarding organic compounds having a plurality of hydroxy groups, citric acid, and the sodium, potassium, and calcium salts of citric acid;
the amounts being effective in combination to accelerate the portland cement composition, and essentially the only constituents of the accelerated portland cement composition influencing its setting time being the water-soluble carbonate compound, the α-hydroxy carbonyl compound, the water-soluble organic retardant, portland cement, and water.

5. The method of claim 4 in which the carbonate compound is sodium carbonate, the α-hydroxy carbonyl compound is sodium hydroxyacetate, and the water-soluble organic retardant is sodium gluconate.

6. The method of claim 5 in which:
  (a) the ratio of the weight of the sodium carbonate to the weight of the cement in such composition is in the range of from about $6 \times 10^{-4}$ to about $2 \times 10^{-2}$;
  (b) the ratio of the weight of the sodium hydroxyacetate to the weight of the cement in such composition is in the range of from about $6 \times 10^{-4}$ to about $5 \times 10^{-2}$; and
  (c) the ratio of the weight of the sodium gluconate to the weight of the cement in such composition is in the range of from about $8 \times 10^{-5}$ to about $3 \times 10^{-2}$.

7. A method for accelerating the setting time of a quantity of portland cement composition comprising mixing with the composition:
  (a) a first ponderable amount of a water-soluble carbonate compound selected from the group consisting of sodium carbonate and potassium carbonate; and
  (b) a second ponderable amount of an α-hydroxy carbonyl compound selected from the group consisting of hydroxyacetic acid, lactic acid, 2-methyllactic acid, dl-mandelic acid and their water-soluble salts, the second amount being effective to accelerate the portland cement composition in the absence of any other admixture;
the first and second amounts being effective in combination to accelerate the portland cement composition, and the only constituents of the accelerated portland cement composition being the water-soluble carbonate compound, the α-hydroxy carbonyl compound, portland cement, aggregate, and water.

8. A method for accelerating the setting time of a quantity of portland cement composition comprising mixing with the composition:
   (a) a first ponderable amount of a water-soluble carbonate compound selected from the group consisting of sodium carbonate and potassium carbonate;
   (b) a second ponderable amount of an α-hydroxy carbonyl compound selected from the group consisting of hydroxyacetic acid, lactic acid, 2-methyllactic acid, dl-mandelic acid and their water-soluble salts; and
   (c) a third ponderable amount of a water-soluble organic retardant selected from the group consisting of retarding organic compounds having a plurality of hydroxy groups, citric acid, and the sodium, potassium, and calcium salts of citric acid;
the amounts being effective in combination to accelerate the portland cement composition, and the only constituents of the accelerated portland cement composition being the water-soluble carbonate compound, the α-hydroxy carbonyl compounds, the water-soluble organic retardant, portland cement, aggregate, and water.

9. An admixture for accelerating the setting time of portland cement compositions consisting essentially of a mixture of:
   (a) a first ponderable amount of a water-soluble carbonate compound selected from the group consisting of sodium carbonate and potassium carbonate;
   (b) a second ponderable amount of an α-hydroxy carbonyl compound selected from the group consisting of dl-mandelic acid and the water-soluble salts of hydroxyacetic acid, lactic acid, 2-methyllactic acid and dl-mandelic acid; and
   (c) a third ponderable amount of a water-soluble organic retardant selected from the group consisting of retarding organic compounds having a plurality of hydroxy groups, citric acid, and the sodium, potassium, and calcium salts of citric acid.

10. The admixture of claim 9 in which the water-soluble carbonate compound is sodium carbonate, the α-hydroxy carbonyl compound is sodium hydroxyacetate, and the water-soluble organic retardant is sodium gluconate.

11. An admixture for accelerating the setting time of portland cement compositions consisting of a mixture of:
   (a) a first ponderable amount of a water-soluble carbonate compound selected from the group consisting of sodium carbonate and potassium carbonate; and
   (b) a second ponderable amount of an α-hydroxy carbonyl compound selected from the group consisting of dl-mandelic acid and the water-soluble salts of hydroxyacetic acid, lactic acid, 2-methyllactic acid, and dl-mandelic acid.

12. The admixture of claim 11 in which the water-soluble carbonate compound is sodium carbonate, and the α-hydroxy carbonyl compound is sodium hydroxyacetate.

13. An admixture for accelerating the setting time of portland cement compositions consisting of a mixture of:
   (a) a first ponderable amount of a water-soluble carbonate compound selected from the group consisting of sodium carbonate and potassium carbonate;
   (b) a second ponderable amount of an α-hydroxy carbonyl compound selected from the group consisting of dl-mandelic acid and the water-soluble salts of hydroxyacetic acid, lactic acid, 2-methyllactic acid and dl-mandelic acid; and
   (c) a third ponderable amount of a water-soluble organic retardant selected from the group consisting of retarding organic compounds having a plurality of hydroxy groups, citric acid, and the sodium, potassium, and calcium salts of citric acid.

14. The admixture of claim 13 in which the water-soluble carbonate compound is sodium carbonate, the α-hydroxy carbonyl compound is sodium hydroxyacetate, and the water-soluble organic retardant is sodium gluconate.

15. A fast-setting, premixed portland cement composition comprising:
   (a) portland cement;
   (b) aggregate;
   (c) a first ponderable amount of a water-soluble carbonate compound selected from the group consisting of sodium carbonate and potassium carbonate; and
   (d) a second ponderable amount of an α-hydroxy carbonyl compound selected from the group consisting of dl-mandelic acid and the water-soluble salts of hydroxyacetic acid, lactic acid, 2-methyllactic acid, and dl-mandelic acid, the second amount being effective to accelerate the portland cement and aggregate mixture in the absence of any other admixture;
the first and the second amounts being effective in combination to accelerate the portland cement and aggregate mixture, and essentially the only constituents of the accelerated portland cement composition influencing its setting time being the water-soluble carbonate compound, the α-hydroxy carbonyl compound, and portland cement.

16. The composition of claim 15 in which the carbonate compound is sodium carbonate, and the α-hydroxy carbonyl compound is sodium hydroxyacetate.

17. The composition of claim 15 in which the first amount of water-soluble carbonate compound and the second amount of α-hydroxy carbonyl compound are such that the final setting time of the portland cement composition containing the two amounts is greater than the final setting time of a corresponding control portland cement composition in which the water-soluble carbonate compound is omitted, the final setting times being measured by the Vicat Needle test.

18. A fast-setting, premixed portland cement composition comprising:
   (a) portland cement;
   (b) aggregate;
   (c) a first ponderable amount of a water-soluble carbonate compound selected from the group consisting of sodium carbonate and potassium carbonate;
   (d) a second ponderable amount of an α-hydroxy carbonyl compound selected from the group consisting of dl-mandelic acid and the water-soluble salts of hydroxyacetic acid, lactic acid, 2-methyllactic acid and dl-mandelic acid; and
   (e) a third ponderable amount of a water-soluble organic retardant selected from the group consisting of retarding organic compounds having a plurality of hydroxy groups, citric acid, and the sodium, potassium, and calcium salts of citric acid; the first, the second, and the third amounts being effective in combination to accelerate the portland cement and aggregate mixture, and essentially the only constituents of the accelerated portland cement composition influencing its setting time being the water-soluble carbonate compound, the α-hydroxy carbonyl compound, the water-soluble organic retardant, and portland cement.

19. The composition of claim 18 in which the carbonate compound is sodium carbonate, the α-hydroxy carbonyl compound is sodium hydroxyacetate; and the water-soluble organic retardant is sodium gluconate.

20. The composition of claim 19 in which:
   (i) the ratio of the weight of the sodium carbonate to the weight of the cement is in the range of from about $6 \times 10^{-4}$ to about $2 \times 10^{-2}$;
   (ii) the ratio of the weight of the sodium hydroxyacetate to the weight of the cement is in the range of from about $6 \times 10^{-4}$ to about $5 \times 10^{-2}$; and
   (iii) the ratio of the weight of the sodium gluconate to the weight of the cement is in the range of from about $8 \times 10^{-5}$ to about $3 \times 10^{-2}$.

21. A fast-setting, premixed portland cement composition consisting of:
   (a) portland cement;
   (b) aggregate;
   (c) a first ponderable amount of a water-soluble carbonate compound selected from the group consisting of sodium carbonate and potassium carbonate; and
   (d) a second ponderable amount of an α-hydroxy carbonyl compound selected from the group consisting of dl-mandelic acid and the water-soluble salts of hydroxyacetic acid, lactic acid, 2-methyllactic acid, and dl-mandelic acid, the second amount being effective to accelerate the portland cement and aggregate mixture in the absence of any other admixture;
the first and the second amounts being effective in combination to accelerate the portland cement and aggregate mixture.

22. The composition of claim 21 in which the carbonate compound is sodium carbonate and the α-hydroxy carbonyl compound is sodium hydroxyacetate.

23. The composition of claim 21 in which the first amount of water-soluble carbonate compound and the second amount of α-hydroxy carbonyl compound are such that the final setting time of the portland cement composition containing the two amounts is greater than the final setting time of a corresponding control portland cement composition in which the water-soluble carbonate compound is omitted, the final setting times being measured by the Vicat Needle test.

24. A fast-setting, premixed portland cement composition comprising:

(a) portland cement;
(b) aggregate;
(c) a first ponderable amount of a water-soluble carbonate compound selected from the group consisting of sodium carbonate and potassium carbonate;
(d) a second ponderable amount of an α-hydroxy carbonyl compound selected from the group consisting of dl-mandelic acid and the water-soluble salts of hydroxyacetic acid, lactic acid, 2-methyllactic acid and dl-mandelic acid; and
(e) a third ponderable amount of a water-soluble organic retardant selected from the group consisting of retarding organic compounds having a plurality of hydroxy groups, citric acid, and the sodium, potassium, and calcium salts of citric acid;
the first, the second, and the third amounts being effective in combination to accelerate the portland cement and aggregate mixture.

25. The composition of claim 24 in which the carbonate compound is sodium carbonate, the α-hydroxy carbonyl compound is sodium hydroxyacetate, and the water-soluble organic retardant is sodium gluconate.

26. The composition of claim 25 in which:
   (i) the ratio of the weight of the sodium carbonate to the weight of the cement is in the range of from about $6 \times 10^{-4}$ to about $2 \times 10^{-2}$;
   (ii) the ratio of the weight of the sodium hydroxyacetate to the weight of the cement is in the range of from about $6 \times 10^{-4}$ to about $5 \times 10^{-2}$; and
   (iii) the ratio of the weight of the sodium gluconate to the weight of the cement is in the range of from about $8 \times 10^{-5}$ to about $3 \times 10^{-2}$.

27. A fast-setting, premixed mortar consisting of the following ingredients in approximately the proportions recited:

| Ingredient | Approximate Parts by Weight |
| --- | --- |
| portland cement | 80 |
| sand | 20 |
| sodium hydroxyacetate | 0.7 |
| sodium carbonate | 0.2 |
| sodium gluconate | 0.005. |

28. A fast-setting, premixed mortar consisting of the following ingredients in approximately the proportions recited:

| Ingredient | Approximate Parts by Weight |
| --- | --- |
| portland cement | 80 |
| sand | 20 |
| sodium hydroxyacetate | 0.7 |
| sodium carbonate | 0.2 |
| stone dust | 0.05 |
| sodium gluconate | 0.005. |

* * * * *

UNITED STATES PATENT AND TRADEMARK OFFICE
CERTIFICATE OF CORRECTION

PATENT NO. : 4,264,367

DATED : April 28, 1981

INVENTOR(S) : Raymond J. Schutz

It is certified that error appears in the above—identified patent and that said Letters Patent is hereby corrected as shown below:

Column 2, line 65, "typical" should read --typically--.

Column 3, lines 28 and 29, "particularily" should read --particularly--.

Column 3, line 36, "constituent" should read --constituent,--.

Column 3, line 51, "catalylzing" should read --catalyzing--.

Column 5, line 2, "Haraza" should read --Harazawa--.

Column 6, lines 33 and 34, "gluconate" should read --gluconate,--.

Column 7, line 4, "potasium" should read --potassium--.

Column 7, line 10, "potasium" should read --potassium--.

Column 7, line 49, "affect" should read --effect--.

Column 7, line 57, "affect" should read --effect--.

UNITED STATES PATENT AND TRADEMARK OFFICE
CERTIFICATE OF CORRECTION

PATENT NO. : 4,264,367
DATED : April 28, 1981
INVENTOR(S) : Raymond J. Schutz

It is certified that error appears in the above—identified patent and that said Letters Patent is hereby corrected as shown below:

Column 9, line 29, "apparantly" should read -- apparently --.

Signed and Sealed this

Eighth Day of September 1981

[SEAL]

Attest:

GERALD J. MOSSINGHOFF

Attesting Officer

Commissioner of Patents and Trademarks